(12) United States Patent
Gaffuri

(10) Patent No.: US 11,473,631 B2
(45) Date of Patent: Oct. 18, 2022

(54) DRIVEN DISK CLUTCH SUB-UNIT FOR A MOTORCYCLE OR OTHER HANDLEBAR VEHICLE

(71) Applicant: STM ITALY S.R.L., Turin (IT)

(72) Inventor: Valerio Gaffuri, Bergamo (IT)

(73) Assignee: STM ITALY S.R.L., Turin (IT)

( * ) Notice: Subject to any disclaimer, the term of this patent is extended or adjusted under 35 U.S.C. 154(b) by 0 days.

(21) Appl. No.: 17/617,323

(22) PCT Filed: Jun. 22, 2020

(86) PCT No.: PCT/IB2020/055847
§ 371 (c)(1),
(2) Date: Dec. 8, 2021

(87) PCT Pub. No.: WO2020/255101
PCT Pub. Date: Dec. 24, 2020

(65) Prior Publication Data
US 2022/0213935 A1 Jul. 7, 2022

(30) Foreign Application Priority Data

Jun. 21, 2019 (IT) .......................... 102019000009858
Nov. 5, 2019 (IT) .......................... 102019000020414

(51) Int. Cl.
*F16D 13/64* (2006.01)
*B62K 11/04* (2006.01)
*F16D 13/52* (2006.01)
*F16D 25/12* (2006.01)

(52) U.S. Cl.
CPC ............ *F16D 13/644* (2013.01); *B62K 11/04* (2013.01); *F16D 13/52* (2013.01); *F16D 25/123* (2013.01); *F16D 2300/0214* (2013.01)

(58) Field of Classification Search
CPC .... F16D 13/646; F16D 25/0638; F16D 13/52; F16D 13/683; F16D 13/648; F16D 13/644
See application file for complete search history.

(56) References Cited

U.S. PATENT DOCUMENTS

| 3,881,584 | A | * | 5/1975 | Marsch | ............... F16D 25/0638 192/70.28 |
| 2004/0238309 | A1 | * | 12/2004 | Hortenhuber | .......... F16D 13/69 192/70.19 |
| 2020/0072298 | A1 | * | 3/2020 | Roqueta | ................ F16D 13/648 |

FOREIGN PATENT DOCUMENTS

| EP | 3001063 A2 | 3/2016 |
| WO | 2018172176 A1 | 9/2018 |
| WO | 2019101342 A1 | 5/2019 |

* cited by examiner

*Primary Examiner* — Stacey A Fluhart
(74) *Attorney, Agent, or Firm* — Bayramoglu Law Offices LLC

(57) ABSTRACT

A clutch subassembly for a motorcycle includes a hub, a plurality of driven discs and an elastic element. The hub includes a plurality of projecting protrusions, wherein the plurality of projecting protrusions define wide through openings capable of promoting a lubrication and, at a same time, the plurality of projecting protrusions reduce a weight of the clutch subassembly.

8 Claims, 5 Drawing Sheets

DRIVEN DISK CLUTCH SUB-UNIT FOR A MOTORCYCLE OR OTHER HANDLEBAR VEHICLE

CROSS REFERENCE TO THE RELAYED APPLICATIONS

This application is the national stage entry of International Application No. PCT/IB2020/055847, filed on Jun. 22, 2020, which is based upon and claims priority to Italian Patent Application No. 102019000009858 filed on Jun. 21, 2019, and Italian Patent Application No. 102019000020414 filed on Nov. 5, 2019, the entire contents of which are incorporated herein by reference.

TECHNICAL FIELD

The present invention refers to a clutch driven disc sub-group for a handlebar vehicle, in particular for a motocross motorcycle, suitable for cooperating with a bell-shaped basket unit provided with discs having a reported layer of friction material.

BACKGROUND

A clutch sub-assembly for a motocross motorcycle or other vehicle with a handlebar normally comprises a drum suitable for being connected to a primary shaft of a gearbox and a plurality of driven discs, generally made of steel, connected to the drum in a rotationally rigid and axially mobile manner. In particular, the drum comprises a substantially cylindrical wall having radial protrusions elongated in a direction parallel to the axis of rotation of the drum on which driven discs are mounted. The elongated radial protrusions guide the axial movement of the driven discs and block the latter from rotation.

The cylindrical wall also includes a plurality of radial holes through which lubricating oil, in which the drum is immersed at least partially when mounted in the engine block, flows to lubricate the driven and trimmed discs, especially due to the action of centrifugal acceleration.

It is always a felt need, in particular in competitions and especially motorcycling competitions, to increase the lightness and/or guarantee a rich supply of lubricating oil on the surfaces of the clutch, which also includes a bell connected in torque transmission, for example through a gear, to a crankshaft of an internal combustion engine of the motorcycle or vehicle with handlebar, and a plurality of friction discs connected to the basket and selectively cooperating with the driven discs to open/close the clutch and, consequently, to interrupt or transfer the power and torque from the crankshaft to the gearbox and, therefore, to a driving wheel of the motorcycle or vehicle with a handlebar.

SUMMARY

The object of the present invention is to satisfy at least in part the requirements specified above.

The object of the present invention is achieved by a clutch subassembly for a vehicle with handlebars, preferably a motorcycle comprising:

a. A hub configured to be connected to the rotation of a motorcycle gearbox to a primary shaft;

b. A plurality of driven discs, preferably of steel, each defining a radially internal shaped profile and such as to couple in a substantially rigid to the rotation and free to translation manner, the translation being parallel to an axis of rotation of the hub, and the driven discs being adapted to cooperate in use with a plurality of friction discs connected via a basket to a motor shaft of the motorcycle;

c. An elastic element having a portion arranged to contrast against a fixed abutment rigidly connected to the hub;

wherein:

the hub includes:

a plurality of protruding protrusions substantially elongated in a direction parallel to that of the axis of rotation of the hub and rigidly connected to the fixed abutment, each protuberance comprising a respective shaped side defined by a treated steel wall and coupled with relative portions of the shaped profile of each driven disc, and at least a first guide portion facing in use with the driven discs having a preferably convex cross section and spaced from the rotation axis and defining, with a corresponding second guiding portion of an adjacent protuberance, radial openings for the passage of lubricating oil;

the hub defines a plurality of axial openings arranged on the opposite side of the fixed abutment.

The clutch subgroup according to the invention allows to have a substantially hollow internal configuration to favor the lightness and circulation of lubricating oil in use. This hollow shape defined by the elongated protuberances is substantially different from the cylindrical drum shape normally used for this type of clutch subassemblies. Overall, the surface of the radial openings between the shaped protrusions is equal to or greater than 15%, preferably greater than 20%, of the theoretical cylindrical surface tangent to the respective radial ridges of the shaped sides.

The circulation effect of the lubricating oil is further favored by the fact that:

the fixed abutment and/or a pusher element interposed between the washer spring and the driven discs to apply in use a selective compression action to the driven discs and guided for this purpose by the protrusions;

Furthermore, in order to be able to adjust engine performance in the best compromise between lightness and flywheel action:

The hub can be of a first metallic material having a first specific weight and a first breaking load and each shaped side being an insert applied on the protuberance and made of a second metallic material having a second specific weight and a second breaking load both higher than the first specific weight and breaking load; or The hub with shaped sides and protrusions are a single body of a metallic material having a density greater than 7 grams/centimeter^3 and an elastic modulus greater than 200 giga-Pascal.

BRIEF DESCRIPTION OF THE DRAWINGS

The construction and functional features of the clutch sub-assembly can be better understood from the detailed description that follows, in which reference is made to the attached drawings which represent a preferred and non-limiting embodiment thereof, wherein.

DETAILED DESCRIPTION OF THE EMBODIMENTS

Figure 1:
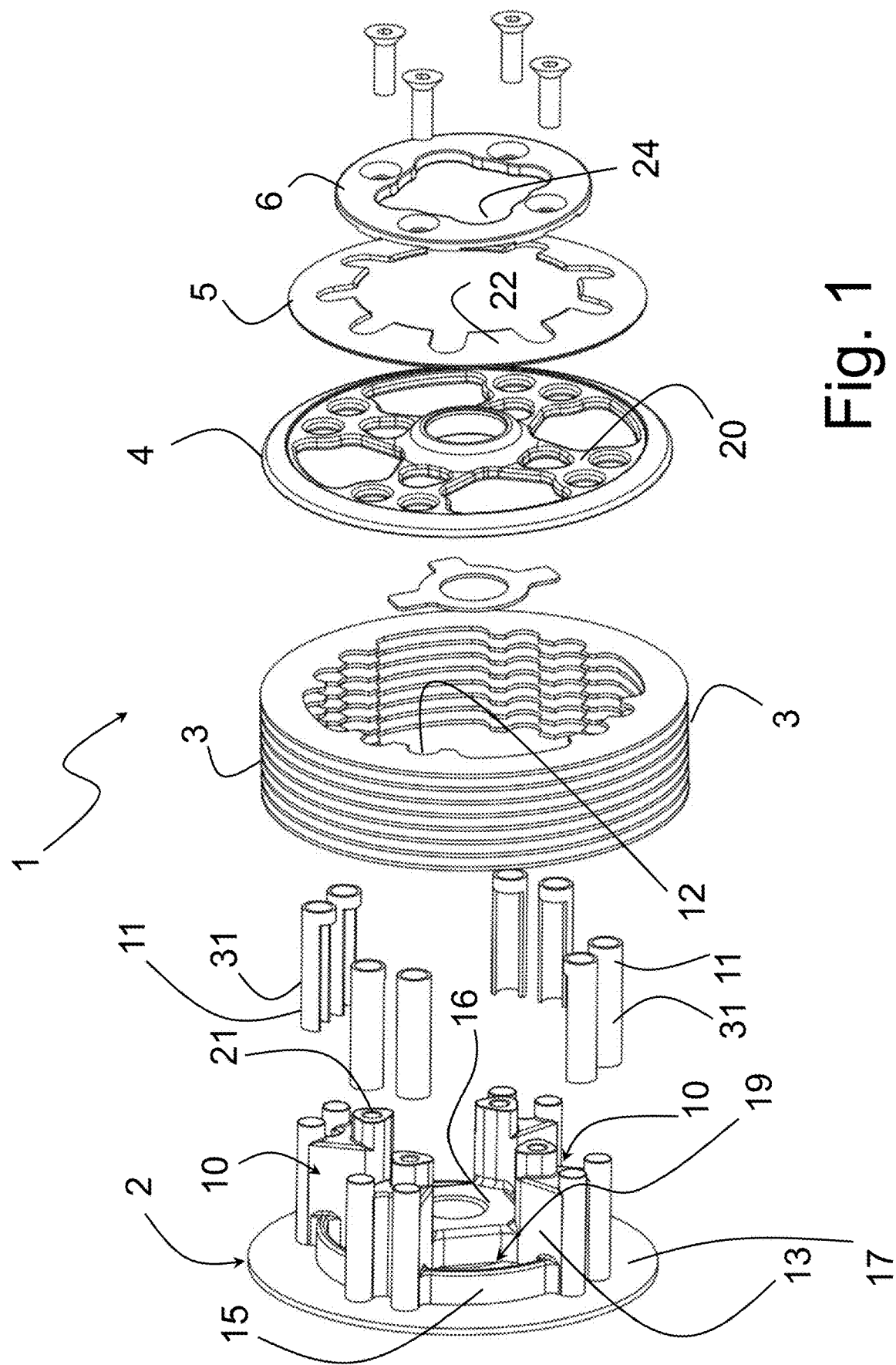
FIG. 1 is an exploded view of a clutch subassembly according to the present invention.

With reference to FIG. 1, 1 indicates as a whole a clutch subassembly comprising a hub 2 adapted to be connected for rotation to a primary shaft of a gearbox, a plurality of driven discs 3 carried by the hub 2 to cooperate with trimmed discs (not shown), a pressure plate element 4 for pressing in use against the driven discs when the clutch is closed, a washer spring 5 applying a load on the pressure plate element 4 and an abutment element 6 rigidly connected to hub 2 for stop washer spring 5 on the opposite side of driven discs 3. When clutch subassembly 1 is assembled with the basket and the friction discs DG, the axial position of abutment element 6 defines a preload of washer spring 5 and the action of friction between driven discs 3 and friction discs.

According to the invention, hub 2 comprises a plurality of elongated and angularly spaced protrusions 10 each of which are projecting as illustrated in FIG. 1. The elongated protrusions 10 are not removable and each has a shaped side 11 cooperating with a shaped portion 12 of a radially internal edge of driven discs 3 to allow axial movement of the discs and block the rotation relative to hub 2 of the discs. To ensure a long service life, the metallic material of shaped side 11 is harder than that of the driven discs 3. For example, if the driven discs are made of steel, the shaped side 11 is defined by steel which undergoes a nitriding treatment.

As illustrated in FIG. 1, each protuberance 10 is column-shaped and has at least a portion 13 facing driven discs 3 and having a closed and preferably convex perimeter. It is possible that adjacent protrusions 10 are connected to each other by means of reinforcement crosspieces or arches (embodiment not shown), which however have a cross section having a maximum size smaller, preferably at least half, of the maximum size of portion 13. An example of a reinforcement arch is shown in FIG. 1 with number 15 and connects bases of adjacent protuberances 10 to each other. However, it is possible that additional arches or crosspieces are also present in axial positions closer to pressure plate element 4.

Figure 2:
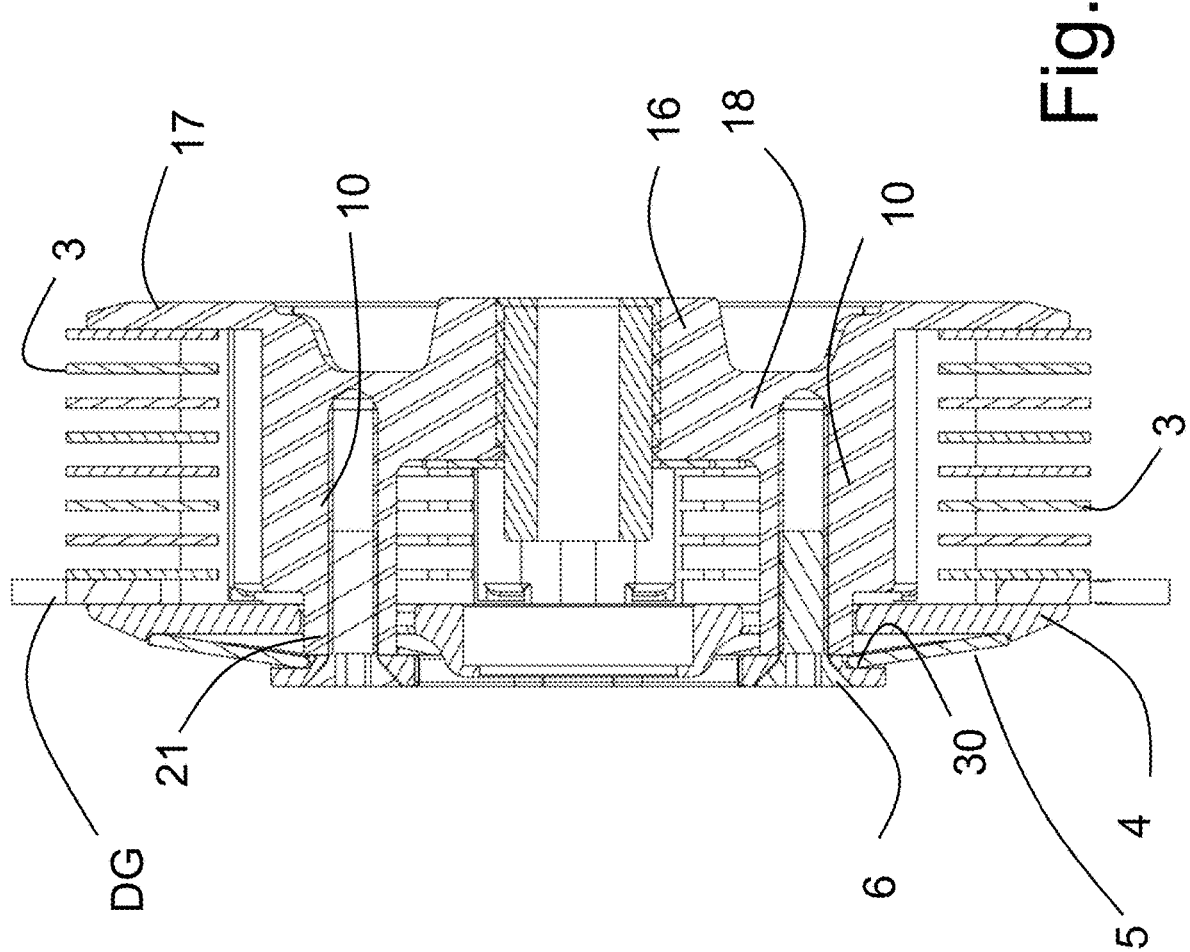
FIG. 2 is a section according to a plane containing an axis of rotation of the clutch subassembly of FIG. 1.

Preferably, hub 2 comprises a central body 16 configured to be connected for rotation to a gearbox (not shown) for example by means of an internal splined profile, and a flanged crown 17 from which the elongated protrusions 10 protrude. Flanged crown 17 surrounds central body 16 and the latter is rigidly connected to the flanged crown by means of spokes 18 (FIG. 2) preferably arranged radially to be aligned with a relative elongated protuberance 10. To increase the passage of lubricating oil towards the internal area of the hub, central body 16, flanged crown 17 and four spokes 18 (in the non-limiting embodiment of FIG. 1) delimit four axial openings 19. It is important to note that the number of axial openings 19 and elongated protrusions 10 can change depending on the application, e.g. based on the power of the motorcycle engine.

According to the embodiment of FIG. 1, pressure plate element 4 has lightening holes and a number of spokes 20 equal to the number of elongated protrusions 10. The latter have respective heads 21, which engage in the corresponding spokes 20 to guide the axial movement of the pressure plate element 4 and prevent it from rotating with respect to the hub 2.

Heads 21 are furthermore detachable, for example by means of screws, to abutment element 6 and have an axial dimension such as to provide a pre-load on driven discs 3 by the action of washer spring 5. Preferably, in order to avoid the relative rotation of washer spring 5 with respect to abutment element 6, a radially internal profile of spring 5 has projections 22 facing the rotation axis, each of which is housed in a respective recess 30 (FIG. 2) of abutment element 6 facing washer spring 5.

In addition, to increase the distribution of the lubricating oil, abutment element 6 also defines a through opening 24 and, preferably, has a substantially annular or crown shape.

According to a preferred embodiment, hub 2 is made of a light alloy, for example based on aluminum, and each shaped side 11 is defined by an insert 31 of a more resistant metal material, e.g. hard and/or with a higher breaking load, such as steel. Each insert 31 can be coupled either by interference, for example shrink fit, or assembled with a small interference or a small clearance.

According to an alternative embodiment, hub 2 is entirely made of a hard metal material with a high breaking load, e.g. steel or the like. This provides to increase the mass if necessary, for example, to increase the flywheel effect of subgroup 1 but at the same time keep a substantially hollow structure in which the lubricating oil can circulate easily during use.

Figure 3:
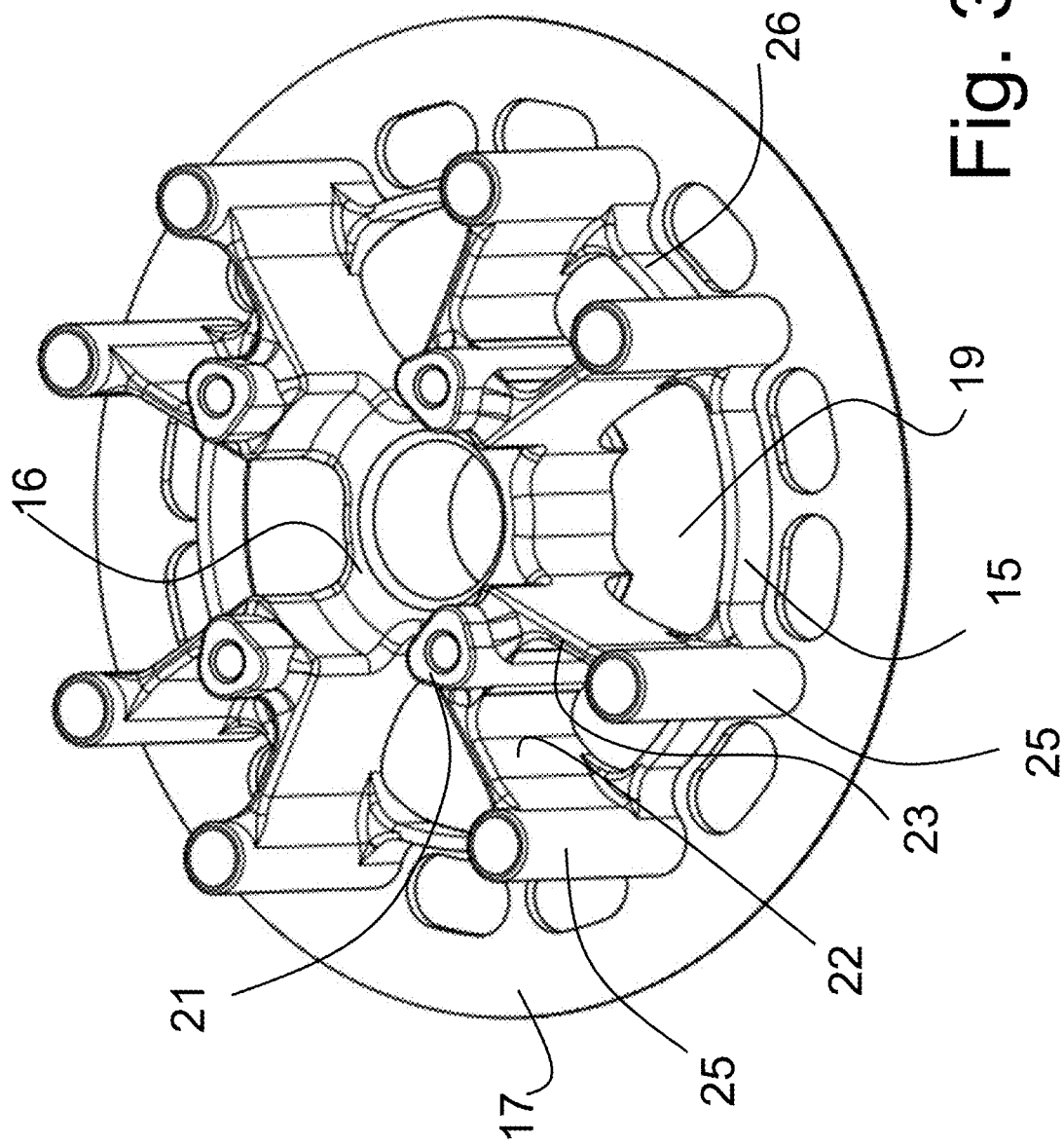
FIG. 3 is a perspective view of a hub according to a further embodiment of the present invention.

FIG. 3 illustrates an example of embodiment of a hub according to such an embodiment, to describe which elements functionally identical to those already described will be indicated with the same reference numbers used in the previous paragraphs.

In particular, protuberances 10 are hollow in a direction parallel to that of rotation and also shaped side 11 is open radially towards the cut-out. Preferably, the cut-out is deep at least half as the height of the protuberance and is circumferentially delimited by ribs 22, 23 converging from shaped side 11 to central body 16, towards head 21. In the embodiment of FIG. 3, shaped side 11 defines a window open in a radial direction and delimited in a circumferential direction between a first and a second guide 25 on which the discs move. According to the embodiment of FIG. 3, therefore, at least a cross section of the protuberance 10 is concave. Furthermore, the guides 25 are at a greater radial distance than the heads 21 and are preferably of a greater number than the latter, so as to form, with the ribs, a branched structure diverging from the central body 16 towards the periphery.

Guides 25 of the same protuberance 10 are connected to each other in a circumferential direction by a wall 26 having a height equal to or less than half the height of protuberance 10. According to the embodiment in FIG. 3, wall 26 is arched like the reinforcement arch 15 and, even more preferably, wall 26 and arch 15 have substantially the same radius of curvature.

Preferably, flanged crown 17 has at least one through opening between two adjacent guides 25 of the same protuberance 10. As shown in FIG. 3, the cut-out also is through in a direction parallel to the axis of rotation on the opposite side to that of head 21.

The hub of FIG. 3 is preferably made of steel and, in this case, the discs slide preferably on guides 25 without intermediate inserts. By means of the ribbed structure, which provides a good compromise between mechanical resistance to the transmitted torque and lightness, it is also possible to make the hub of FIG. 3 in a light alloy such as for example an aluminum alloy. Preferably in this case guides 25 are covered by inserts of a material that is harder and more resistant to friction than the discs.

Figure 4:
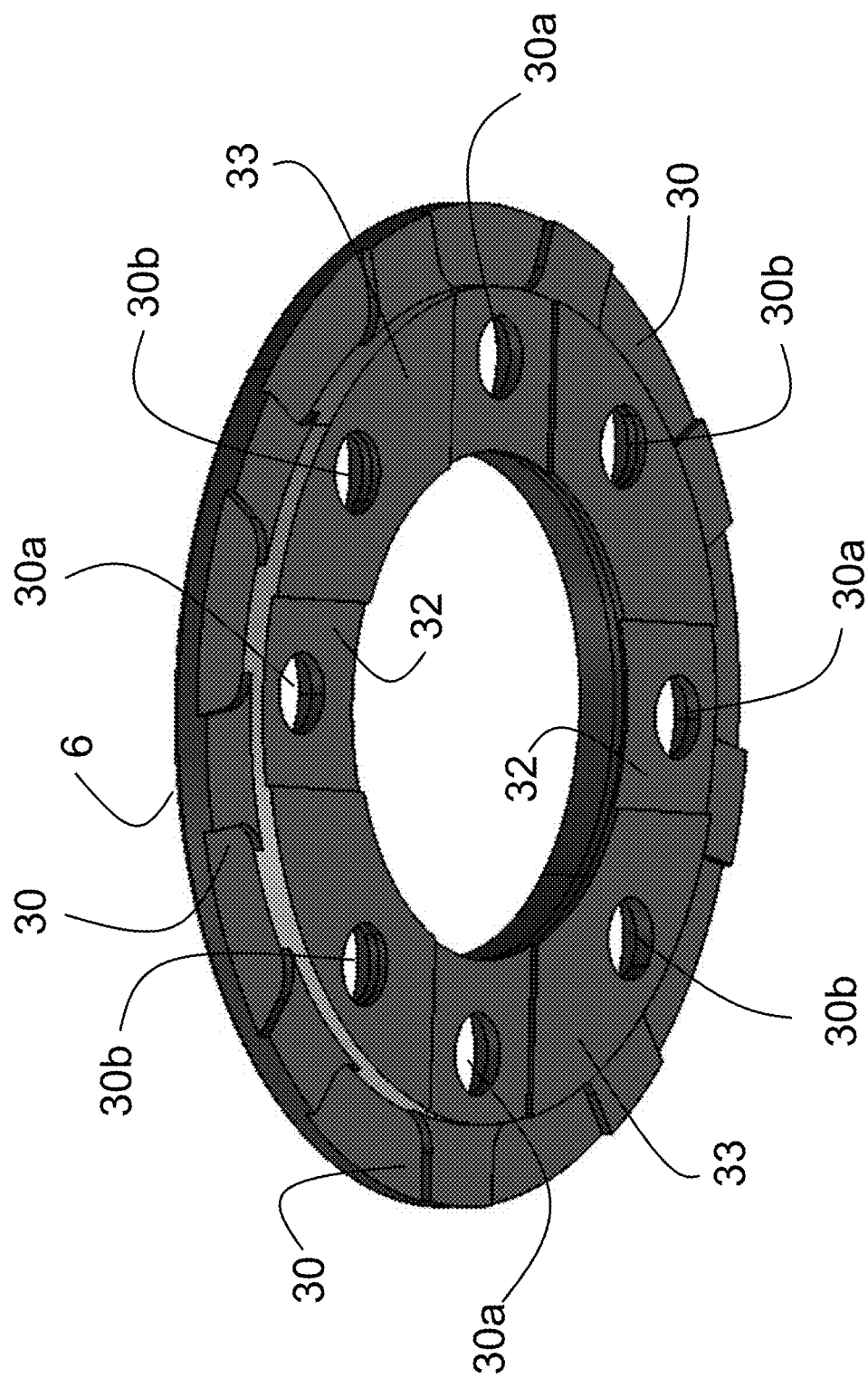
FIG. 4 is a bottom perspective view of a component of the subgroup of FIG. 1.

According to a preferred embodiment, as shown in FIG. 4, fixed abutment 6 defines a first and a second plurality of holes 30a, 30b to allow mounting on heads 21 in respective first and second discrete angular positions. In an angular position corresponding to the first and second plurality of holes 30a, 30b a lower face of the abutment element defines a series of recesses 32 and a series of projection 33 alternated with each other so as to obtain different assembly preloads of washer spring 5 depending on the angular assembly on heads 21. In particular, as illustrated in FIG. 4, recesses 32 are associated with the first plurality of holes 30 and projections 33 load washer spring 5 to a first level when abutment element 6 is attached on the heads 21 in the first angular position. When, on the other hand, projections 33 associated with the second plurality of holes 30b are abutting against heads 21 in the second angular position, washer spring 5 is loaded at a second level lower than the first level. In this way it is possible to make a discreet adjustment on the pre-load of spring 5.

Figure 5:
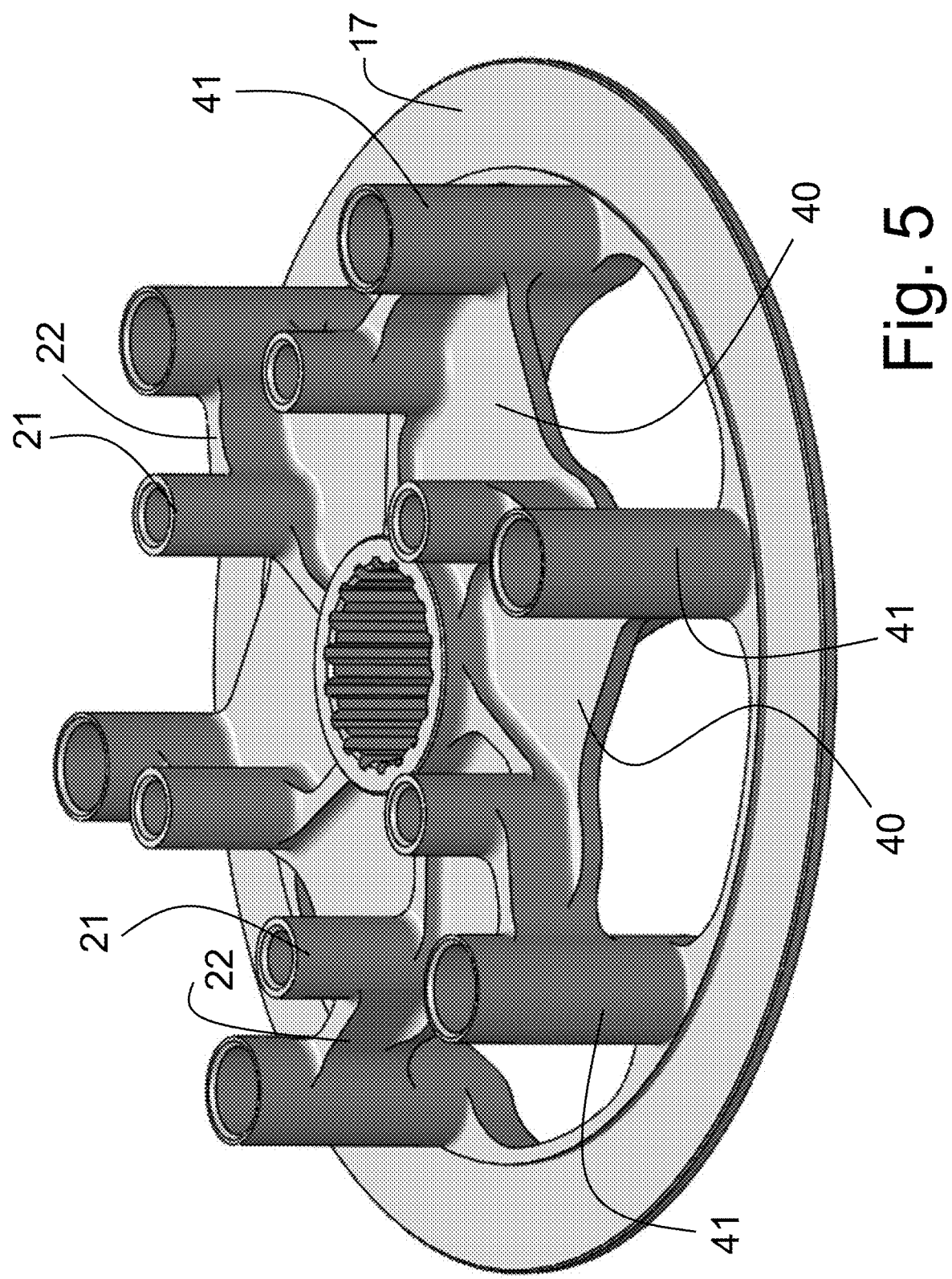
FIG. 5 is a perspective view of a hub according to a third embodiment of the present invention.

FIG. 5 shows an example of alternative embodiment of the hub of FIG. 3 i.e. made of a harder and/or more resistant material than aluminum, to describe which, elements functionally identical to those already described will be indicated with the same reference numbers used in the previous paragraphs.

In particular, protrusions 10 are connected together by a web or diaphragm 40 extending radially in a direction substantially perpendicular to that of rotation.

Diaphragm 40 joins together shaped profiles 11 which, in the embodiment of FIG. 5, comprise a convex, preferably cylindrical, isolated surface 41, the radial openings being circumferentially delimited by two adjacent isolated convex surfaces 41. Between head 21 and convex isolated surface 41, rib 22 is arranged along a generic radial direction, each head 21 being at a radial dimension lower than that of the relative isolated convex surface 41. As illustrated in FIG. 5, at each convex isolated surface 41 corresponds to a single head 21 and preferably a single rib 22. Each convex isolated surface 41 acts as a guide for the movement of the discs parallel to the axis of rotation.

Preferably, flanged crown 17 has at least one opening passing between two adjacent convex isolated surfaces 41 of as many protuberances 10. In particular, the opening is through in a direction parallel to the rotation axis on the opposite side to that of head 21. The hub of FIG. 5 is preferably made of steel and, in this case, the discs slide preferably on the surfaces 41 without intermediate inserts.

What is claimed is:

1. A clutch sub-assembly for a motorcycle comprising:
   a hub configured to be connected in rotation to a main shaft of a motorcycle gearbox;
   a plurality of driven discs, wherein each of the plurality of driven discs defines a radially internal shaped profile to couple in a substantially rigid manner to rotation and free to translation parallel to an axis of a rotation of the hub, the plurality of driven discs are configured to cooperate in use with a plurality of friction discs connected by a clutch basket to a motor shaft of the motorcycle;
   an elastic element having a portion arranged to contrast against a fixed abutment rigidly connected to the hub, wherein the hub comprises:
      a plurality of projecting protrusions, wherein
      the plurality of projecting protrusions are substantially elongated in a direction parallel to a direction of a hub rotation axis and rigidly connected to the fixed abutment,
      each of the plurality of projecting protrusions comprises a respective shaped side and each of the plurality of projecting protrusions is coupled with relative portions of the radially internal shaped profile of the each of the plurality of driven discs, and
      at least a first guide portion, wherein the first guide portion faces, in use, to the plurality of driven discs having a cross section spaced from the hub rotation axis and the first guide portion defines, with a corresponding second guiding portion of an adjacent protrusion, radial openings for a passage of a lubricating oil;
   the hub defines a plurality of axial openings arranged on an opposite side of the fixed abutment the elastic element is a washer spring;
   wherein the plurality of projecting protrusions are hollow in an axial direction and a radial direction and the respective shaped side comprises a first and second guide defining a radial window open towards an axis of the hub to define, in correspondence with the radial window, a concave cross section of each of the plurality of projecting protrusions.

2. The clutch sub-assembly according to claim 1, wherein at least one of the plurality projecting protrusions comprises a head connected to the fixed abutment and a first and a second rib converge starting from the first and second guide toward the head.

3. The clutch sub-assembly according to claim 1, wherein a cavity of the each of the plurality of projecting protrusions is axially passing in a direction opposite to a direction of the fixed abutment.

4. The clutch sub-assembly according to claim 1, wherein the hub is made of a single material.

5. The clutch sub-assembly according to claim 1, comprising a pressure plate element defining a plurality of openings, wherein at least one of the plurality of openings engages on the head to guide an axial movement of the pressure plate element under an action of the elastic element.

6. The clutch sub-assembly according to claim 5, wherein the pressure plate element comprises a plurality of spokes, wherein at least one of the plurality of spokes defines the at least one of the plurality of openings.

7. A clutch sub-assembly for a motorcycle comprising:
   a hub configured to be connected in rotation to a main shaft of a motorcycle gearbox;
   a plurality of driven discs, wherein each of the plurality of driven discs defines a radially internal shaped profile to couple in a substantially rigid manner to rotation and free to translation parallel to an axis of a rotation of the hub, the plurality of driven discs are configured to cooperate in use with a plurality of friction discs connected by a clutch basket to a motor shaft of the motorcycle;
   an elastic element having a portion arranged to contrast against a fixed abutment rigidly connected to the hub, wherein the hub comprises:
      a plurality of projecting protrusions, wherein
      the plurality of projecting protrusions are substantially elongated in a direction parallel to a direction of a hub rotation axis and rigidly connected to the fixed abutment,
      each of the plurality of projecting protrusions comprises a respective shaped side and each of the plurality of projecting protrusions is coupled with relative portions of the radially internal shaped profile of the each of the plurality of driven discs, and
      at least a first guide portion, wherein the first guide portion faces, in use, to the plurality of driven discs having a cross section spaced from the hub rotation axis and the first guide portion defines, with a corresponding second guiding portion of an adjacent protrusion, radial openings for a passage of a lubricating oil, the hub defines a plurality of axial openings arranged on an opposite side of the fixed abutment the elastic element is a washer spring, and an arch or a reinforcing element for connecting two projecting protrusions, a maximum size of a cross section of the reinforcing element is less than a maximum dimension of a cross section of the two projecting protrusions.

8. A clutch sub-assembly for a motorcycle comprising:
- a hub configured to be connected in rotation to a main shaft of a motorcycle gearbox,
- a plurality of driven discs, wherein each of the plurality of driven discs defines a radially internal shaped profile to couple in a substantially rigid manner to rotation and free to translation parallel to an axis of a rotation of the hub, the plurality of driven discs are configured to cooperate in use with a plurality of friction discs connected by a clutch basket to a motor shaft of the motorcycle;
- an elastic element having a portion arranged to contrast against a fixed abutment rigidly connected to the hub, wherein the hub comprises:
  - a plurality of projecting protrusions, wherein the plurality of projecting protrusions are substantially elongated in a direction parallel to a direction of a hub rotation axis and rigidly connected to the fixed abutment,
  - each of the plurality of projecting protrusions comprises a respective shaped side and each of the plurality of projecting protrusions is coupled with relative portions of the radially internal shaped profile of the each of the plurality of driven discs, and
  - at least a first guide portion, wherein the first guide portion faces, in use, to the plurality of driven discs having a cross section spaced from the hub rotation axis and the first guide portion defines, with a corresponding second guiding portion of an adjacent protrusion, radial openings for a passage of a lubricating oil;

the hub defines a plurality of axial openings arranged on an opposite side of the fixed abutment the elastic element is a washer spring;

wherein the fixed abutment is configured to be fixed in one of a first and second angular position and defines a series of recesses and a series of projections facing the hub and cooperating with the elastic element to define a first and a second preload different from each other when the fixed abutment is mounted in the first or second angular position respectively.

* * * * *